(12) United States Patent
Hopler et al.

(10) Patent No.: US 6,989,898 B2
(45) Date of Patent: Jan. 24, 2006

(54) DYNAMIC METHOD FOR CHANGING THE OPERATION OF A MULTIPLE-PASS MONOCHROMATOR BETWEEN ADDITIVE AND SUBTRACTIVE MODES

(75) Inventors: Mark D. Hopler, Windsor, CA (US); Rong Liu, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 317 days.

(21) Appl. No.: 10/361,304

(22) Filed: Feb. 10, 2003

(65) Prior Publication Data

US 2004/0145740 A1      Jul. 29, 2004

Related U.S. Application Data

(63) Continuation-in-part of application No. 10/349,898, filed on Jan. 23, 2003.

(51) Int. Cl.
    *G01J 3/12*     (2006.01)
(52) U.S. Cl. .................................. 356/333; 356/326
(58) Field of Classification Search ............... 356/333, 356/334, 331, 326, 328
    See application file for complete search history.

(56) References Cited

U.S. PATENT DOCUMENTS 6,646,740 B2 *  11/2003  Braun et al. ................ 356/334

OTHER PUBLICATIONS

Czerny, M. et al., "Uber den Astigmatismus bei Spiegelspektrometern," Z. Physik, 61, (1930), p. 792-797.
Littman, M. G. et al., "Spectraqlly Narrow Pulsed Dye Laser Without Beam Expander," Applied Optics, vol. 17, No. 14, ( Jul. 15, 1978), p. 2224-2227.
Born, M., et al., "Principles of Optics," 6th Edition, Pergamon Press, (1980), p. 244.
"Agilent 8614xB Optical Spectrum Analyzer Family Technical Specifications," Agilent Technologies, Inc., (Feb. 8, 2002), pp. 1-11.

* cited by examiner

*Primary Examiner*—Layla G. Lauchman (57) ABSTRACT

Inverting optics are used to invert, with respect to the dispersion plane, the wavefront of a monochromator employing a beam making more than one pass through the dispersing medium. Further, the inverting functionality can be turned-on or turned-off, thereby reversibly converting between additive and subtractive monochromator architectures. Inversion reversal is accomplished by reorienting the inverting optics orthogonally about an axis coaxial with the beam, either back and forth or monotonically, or by displacing portions or all of the inverting optics into and out of the beam. Examples of inverting optics include Dove prisms and equivalent multiple all-reflective surfaces. The system and method can be applied to two-pass and other multi-pass monochromators and to dual and other multiple serial monochromator configurations using diffraction gratings or other dispersing elements.

17 Claims, 6 Drawing Sheets

DYNAMIC METHOD FOR CHANGING THE OPERATION OF A MULTIPLE-PASS MONOCHROMATOR BETWEEN ADDITIVE AND SUBTRACTIVE MODES

CROSS-REFERENCE TO RELATED APPLICATIONS

This application is a Continuation-in-Part claiming priority benefit of commonly assigned U.S. patent application Ser. No. 10/349,898 entitled "DYNAMIC METHOD FOR CHANGING THE OPERATION OF A MULTIPLE-PASS MONOCHROMATOR BETWEEN ADDITIVE AND SUBTRACTIVE MODES," filed Jan. 23, 2003, the disclosure of which is hereby incorporated herein by reference.

TECHNICAL FIELD

The invention relates to optical spectral analysis and particularly to dynamic systems and methods for changing the operation of a multiple-pass monochromator between additive and subtractive modes.

BACKGROUND OF THE INVENTION

It is possible for a light beam to make multiple dispersive passes with respect to a dispersive medium, but for simplicity, a double-pass case illustrates the relevant principles.

Figure 1:
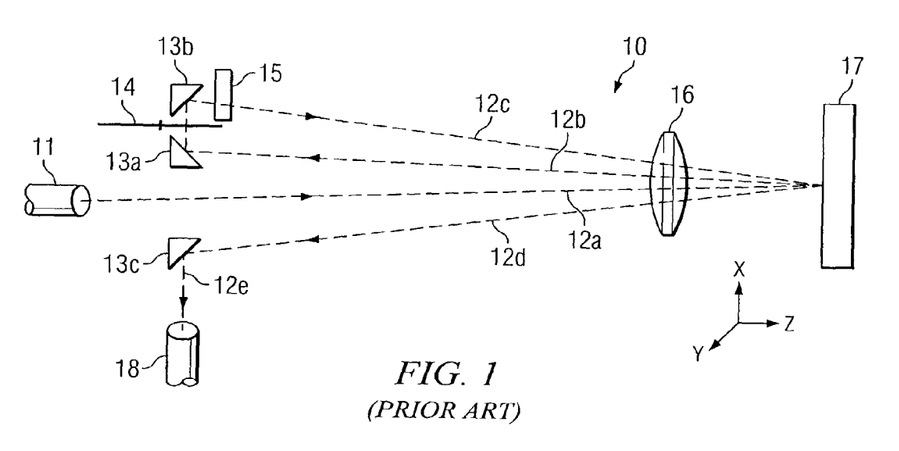
FIG. 1 illustrates schematically a current optical spectrum analyzer (OSA) instrument incorporating a double-pass monochromator.

FIG. 1 illustrates schematically a current optical spectrum analyzer (OSA) instrument (see Agilent Technologies data sheet 8614xB Optical Spectrum Analyzer Family Technical Specifications), incorporating a double-pass monochromator 10 having diffraction grating 17 as a dispersive element. An input beam 12a typically entering through input fiber 11, which can serve as an input aperture, is directed by first mirror 13a and second mirror 13b through collimating element 16 in two passes 12a and 12c onto diffraction grating 17. Between the two passes, the beam is directed through an intermediate resolution defining aperture that is normally incorporated into slit wheel 14 to provide a range of aperture sizes. Collimating element 16, for example a lens, refocuses diffracted light from the surface of grating 17 in each pass 12b and 12d back into the optical plane of slit wheel 14. Output beam 12e is deflected by output mirror 13c into output fiber 18, which can function as an output aperture of monochromator 10, such that it reduces stray light in the system and, due to diffraction and coupling effects, improves resolution bandwidth compared to a single-pass monochromator.

Referring to the coordinate axes in FIG. 1, the grating dispersion direction is parallel to the y-axis, which is perpendicular to the plane of the figure, whereas the non-dispersion direction is parallel to the x-axis, pointing upward parallel to the plane of the figure. Both x and y axes are mutually perpendicular to the z-axis, which is essentially parallel to the effective propagation direction of light beam passes 12a, 12b, 12c, and 12d. There are two varieties of double-pass monochromator, the additive or double-dispersive monochromator, and the subtractive or re-condensing monochromator. Each of these architectures provides specific advantages depending on the application. In an additive monochromator, the orientation of the wavefront of light impinging on dispersing component 17 is the same, for example plus y, in both first pass and second pass. Because the light beam is focused between two passes 12a and 12c through intermediate slit or aperture system 14 (where the wavefront both in and perpendicular to the plane of dispersion is naturally inverted to −y, −x), the additive architecture requires introduction of an additional top-to-bottom inversion (−y to plus y) of the wavefront in the plane of dispersion between the first contact and the second contact with dispersing element 17. In current instruments, component 15 typically represents a half-wave plate that rotates the polarization of the light beam by 90 degrees between first pass 12b and second pass 12c. Alternatively (or additionally), component 15 illustratively represents a top-to-bottom inverter (−y to plus y) of the wavefront, which, when inserted in second pass 12c immediately after reflection from second mirror 13b, converts monochromator 10 from subtractive to additive architecture. This results in the dispersion in second pass 12c being additive to the dispersion in first pass 12a (both plus y or both −y), producing a distinct narrowing in system resolution of a double-pass monochromator compared with that of a single-pass monochromator.

In the prior art, depicted by subtractive monochromator 10, simply by focusing the light through the intermediate slit in slit wheel 14, the wavefront is inverted top to bottom (−y) relative to the orientation of first pass wavefront orientation (plus y) at dispersing element 17. In general, it is not necessary to further invert the wavefront, as the required wavefront inversion is already accomplished, such that a separate wavefront-inverting component illustratively represented by component 15 is not needed. The spectrally dispersed and filtered (by intermediate slit at slit wheel 14) light from first pass 12b is spectrally recombined by dispersing element 17 in second pass 12c. The result is a spectrally uniform and highly compact focal spot at the monochromator exit aperture or slit 18. Since the light is already spectrally dispersed and prefiltered at intermediate slit 14 in the first pass, system resolution for a two-pass subtractive monochromator is substantially the same as system resolution of a corresponding single pass monochromator.

Additionally, all path lengths of the light transmitted through a subtractive monochromator are made equal by having inverted the wavefront top-to-bottom. For example, in a reflective diffraction grating implementation, diffraction grating 17 is tilted to align the desired wavelength to intermediate slit 14, thereby introducing a wavelength-dependent path length. For example, the beam of light impinging on the grating surface encounters path lengths varying monotonically with position along the length of the grating in the plane of dispersion, resulting in a range of path lengths corresponding to the range of wavelengths transmitted through output slit 18. Inverting the wavefront between passes cancels this path length difference and hence the temporal dispersion that results from path length difference. The additive monochromator architecture does not cancel this path length variation, but rather effectively doubles it in the second pass.

In an optical spectrum analyzer (OSA) employing a monochromator as its optical engine, a conventional operational procedure is to sweep a reflective diffraction grating (or other dispersive component) in angle in order to obtain the spectra of various optical wavelengths. The spectrally dispersed light is propagated onto a variable width output slit and is sensed in an analog fashion by a single finite area photodiode or similar detector. The speed at which an OSA can determine spectral information derived from a photodetector signal is contingent on many factors, including the physical size (active area) of the photodiode. Small area photodiodes are generally faster and have a direct impact on the speed of an OSA. The subtractive monochromator engine will provide an output spot of filtered and recombined spectra that can be focused within a small detector active area. An additive monochromator produces a highly spread or dispersed spot on the output slit. This requires a large area detector to collect the exiting light. In addition to being slow, the large area of the detector is inclined to collect unwanted or "stray" light. This necessitates some sort of noise suppression, for example a chopping system, to minimize optical noise. Such accessories add both expense and complexity. On the other hand, an additive monochromator has a significantly better (narrower wavelength spread) resolution, which is desirable in certain applications.

A narrower resolution in a multiple-pass monochromator is generally useful only when the slits (both internal and exit) are positioned near their narrow settings. In such circumstances, even an additive monochromator would function well with a small area photodiode. It is when the slits are enlarged that the small area detector will not capture the entire incident cone of output light from an additive monochromator. Given these considerations, if a component could be added to a monochromator architecture that would allow the architecture to switch reversibly between additive and subtractive, then the functionality could be additive and achieve the narrowest resolution bandwidth on the smallest slit, and could revert to a subtractive configuration for all wider slits in order to increase speed. This maximizes OSA measurement speeds at all slit widths, while providing the opportunity for the narrowest resolution bandwidth on the smallest slit, which is the only filter setting where an improvement in resolution bandwidth offers substantial value.

BRIEF SUMMARY OF THE INVENTION

The present invention is directed to a system and method in which inverting optics are used to invert, with respect to the dispersion plane, the wavefront of a monochromator beam making more than one pass through the dispersing medium. Further, the inverting functionality can be turned-on or turned-off, thereby reversibly converting between additive and subtractive monochromator architectures. In various embodiments, reversal is accomplished by reorienting the inverting optics orthogonally about an axis coaxial with the beam, either back and forth or monotonically, or by displacing portions or all of the inverting optics into and out of the beam. Examples of inverting optics include Dove prisms, other inverting prisms, and equivalent multiple all-reflective surfaces. The system and method can be applied to two-pass and other multi-pass monochromators and to dual and other multiple serial monochromator configurations using diffraction gratings or other dispersing elements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 2A:
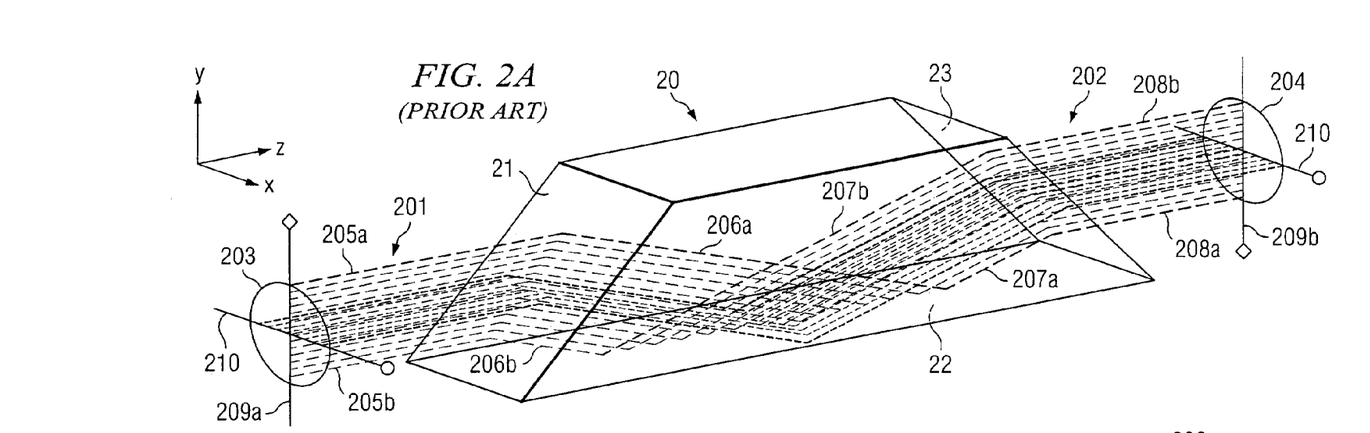
FIGS. 2A–2B illustrate the wavefront-inverting properties of a Dove refractive prism.
Figure 2B:
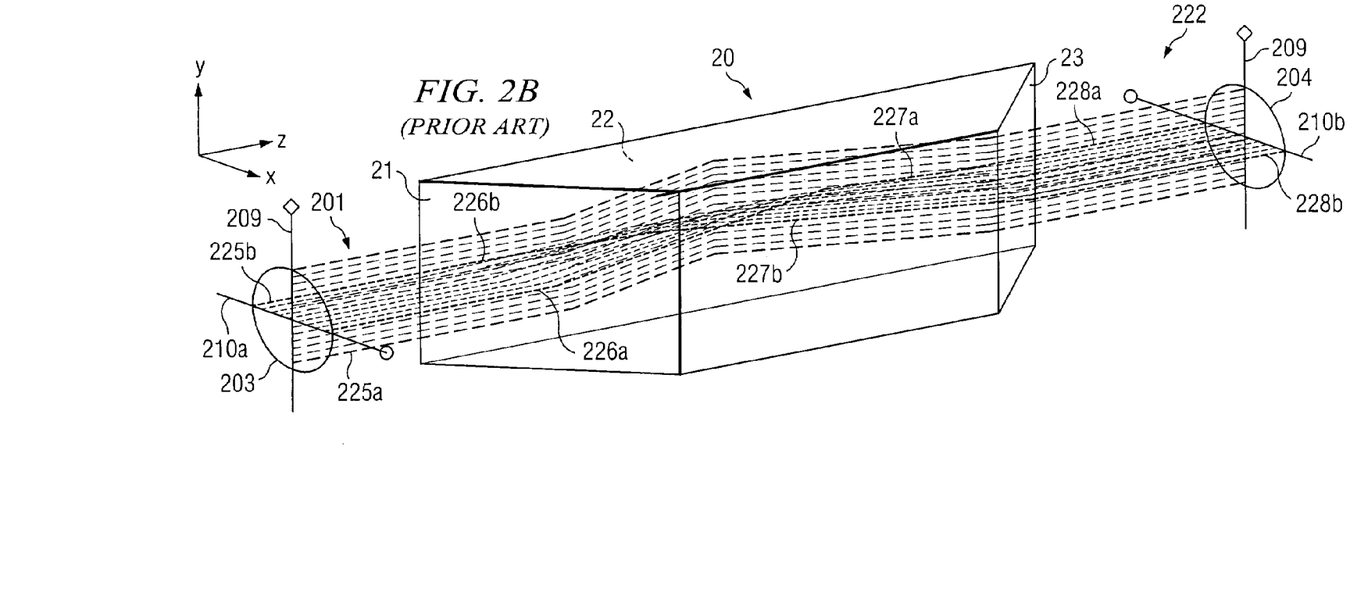

In accordance with embodiments of the present invention, a Dove refractive prism (see for example M. Born and E. Wolf, "Principles of Optics," $6^{th}$ Edition, Pergamon Press, 1980, p. 244) or equivalent mirror system added to a monochromator architecture allows the architecture to switch reversibly between additive and subtractive, such that the functionality can for example be additive and achieve the narrowest resolution bandwidth with the narrowest slit and can revert to a subtractive functionality and achieve increased speed for all wider slits. FIGS. 2A–2B illustrate the well-known wavefront-inverting properties of a Dove refractive prism 20. When Dove prism 20 is oriented as illustrated in FIG. 2A in input light beam 201 propagating along the z-axis, input wavefront 203 aligned with respective horizontal and vertical x- and y-axes 210 and 209a when passed through Dove prism 20 is inverted 180 degrees relative to the y-axis to produce output wavefront 204 aligned with inverted vertical y-axis 209b in output light beam 202. No wavefront inversion occurs relative to horizontal x-axis 210 when passing input beam 201 through Dove prism 20. For ease of understanding the wavefront-inverting properties of Dove prism 20, the extreme rays of input beam 201 in the top and bottom y-axis positions are labeled respectively top ray 205a and bottom ray 205b. At input face 21 of Dove prism 20, both top ray 205a and bottom ray 205b are refracted downward in respective rays 206a and 206b, and then are reflected at reflective face 22 (out of view within Dove prism 20 in FIG. 2A) to produce respective rays 207a and 207b, where ray 207b is now the top ray and ray 207a is now the bottom ray, as depicted in FIG. 2A. Rays 207a, 207b are then refracted at output face 23 of Dove prism 20 to propagate as respective output rays 208a, 208b within output beam 202 in the same z-axis direction as original input beam 201, forming wavefront 204 inverted relative to the vertical y-axis as depicted by the diamond symbols on the vertical wavefront axes in FIG. 2A.

FIG. 2B illustrates Dove prism 20 reoriented orthogonally about the z-axis propagation direction of input beam 201 relative to the orientation depicted in FIG. 2A. Through the same processes as described in connection with FIG. 2A, in this configuration output wavefront 204 is inverted relative to the x-axis, such that horizontal axis 210a of input wavefront 203 is inverted to become horizontal axis 210b at output wavefront 204. The wavefront inversion is horizontal only, as depicted by the circular symbols on the horizontal wavefront axes in FIG. 2B, leaving wavefront vertical axis orientation 209 unaltered.

Figures 3A, 3B:
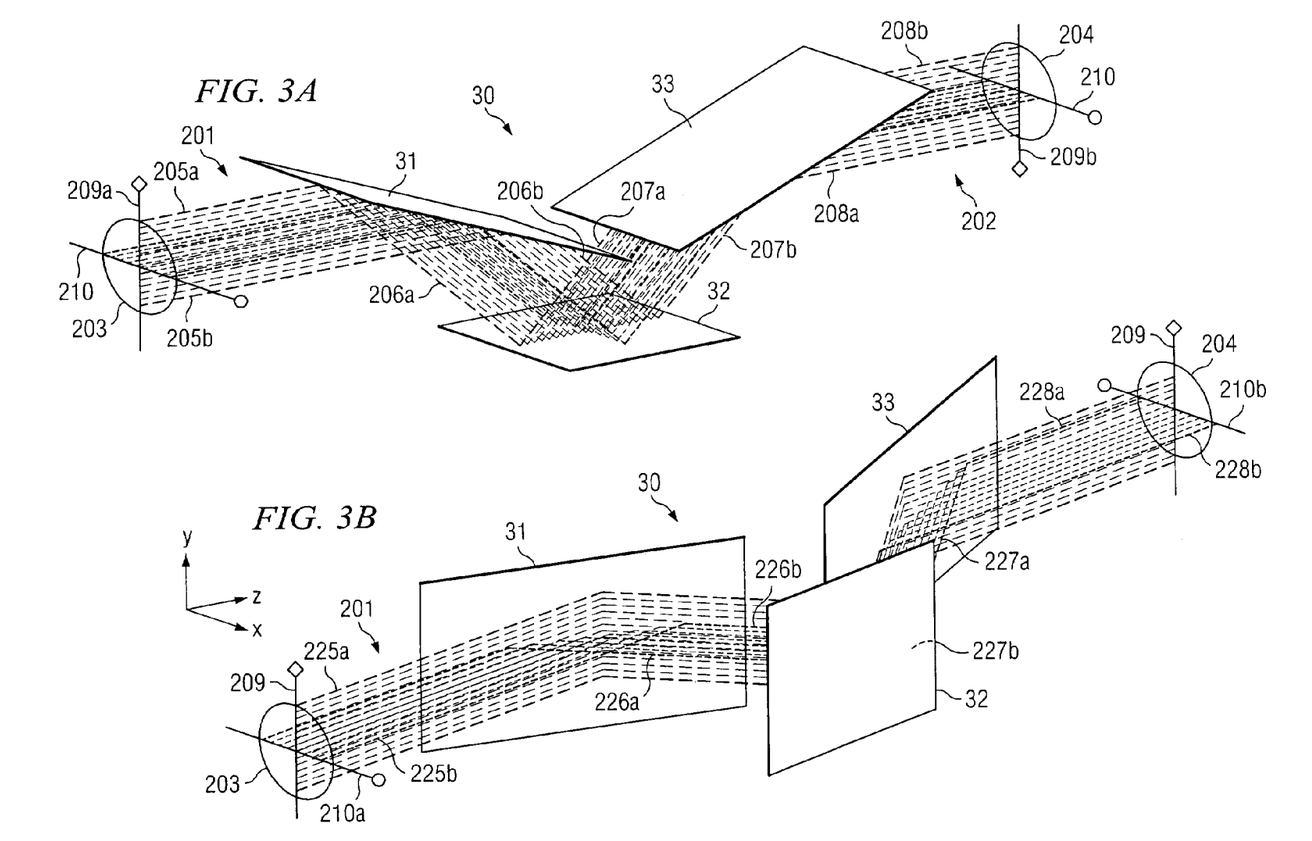
FIGS. 3A and 3B represent schematically a mirror assembly functionally equivalent to a Dove prism.

If for example Dove prism 20 is positioned in a beam propagating through a two-pass monochromator, and if the dispersion direction of the diffraction grating or other dispersing component is parallel to the vertical y-axis, then the configuration depicted in FIG. 2A will invert the orientation of the wavefront relative to the vertical plane of dispersion. If the monochromator was in a subtractive configuration without Dove prism 20, it will be converted to an additive state if Dove prism 20 is positioned between the first and second encounters of the beam with the diffraction grating or other dispersing component. To nullify the switching effect, Dove prism 20 is further reoriented orthogonally about the z-axis propagation direction relative to the orientation in FIG. 2A, inverting the wavefront orientation in a direction orthogonal to the plane of dispersion and thereby imparting no effective change to the subtractive monochromator. Because it is a monolithic component, Dove prism 20 is easy to fabricate and align; however, because of aberration problems recognized in the art to be caused by dispersion accompanying refraction at surfaces 21 and 23, it is a viable solution only in a collimated beam environment. FIGS. 3A and 3B represent schematically mirror assembly 30 functionally equivalent to Dove prism 20. Such an all-reflective configuration does not introduce unwanted dispersion, but is generally more expensive and difficult to build, align and rotate.

In FIGS. 3A and 3B, reflective input and output surfaces 31 and 33 respectively perform beam deflecting functions in mirror assembly 30 analogous to refractive input and output faces 21 and 23 of Dove prism 20, and reflective surface 32 of mirror assembly 30 performs a function analogous to reflective face 22 of Dove prism 20. In FIG. 3A, input wavefront 203 is inverted relative to the vertical y-axis, producing output wavefront 204, such that the direction of input wavefront vertical axis 209a is inverted to become output wavefront vertical axis 209b, and horizontal wavefront axis 210 is unaltered. Conversely, in FIG. 3B in which mirror assembly 30 is reoriented orthogonally about the z-axis propagation direction relative to its orientation in FIG. 3A, output wavefront 204 is inverted relative to the x-axis, such that horizontal axis 210a of input wavefront 203 is inverted to become horizontal axis 210b at output wavefront 204. The wavefront inversion is horizontal, leaving wavefront vertical axis orientation 209 unaltered. In a manner similar to that described in connection with FIG. 2A, outer rays 205a, 205b, 225a, 225b of input beam 201 can be traced through mirror assembly 30 to obtain the respective wavefront inversions.

To achieve reversible switching, configurations such as those depicted in FIGS. 2A–3B do not necessarily have to be reoriented back and forth about the z-axis propagation direction. They can simply be rotationally reoriented in orthogonal steps in the same monotonic direction for each transition between additive and subtractive architecture. They can also be inserted into and then retracted from the beam. As used herein, "orthogonally" denotes orientation at substantially right angles. In the present embodiments, an angle of 90 degrees is functionally ideal, although other angles ranging from approximately 80 degrees to approximately 100 degrees provide satisfactory performance. Similarly, although "coaxial" denotes ideal alignment, the term as used herein is intended to extend to a tolerance range of approximately plus and minus five degrees of misalignment.

Figures 4A, 4B:
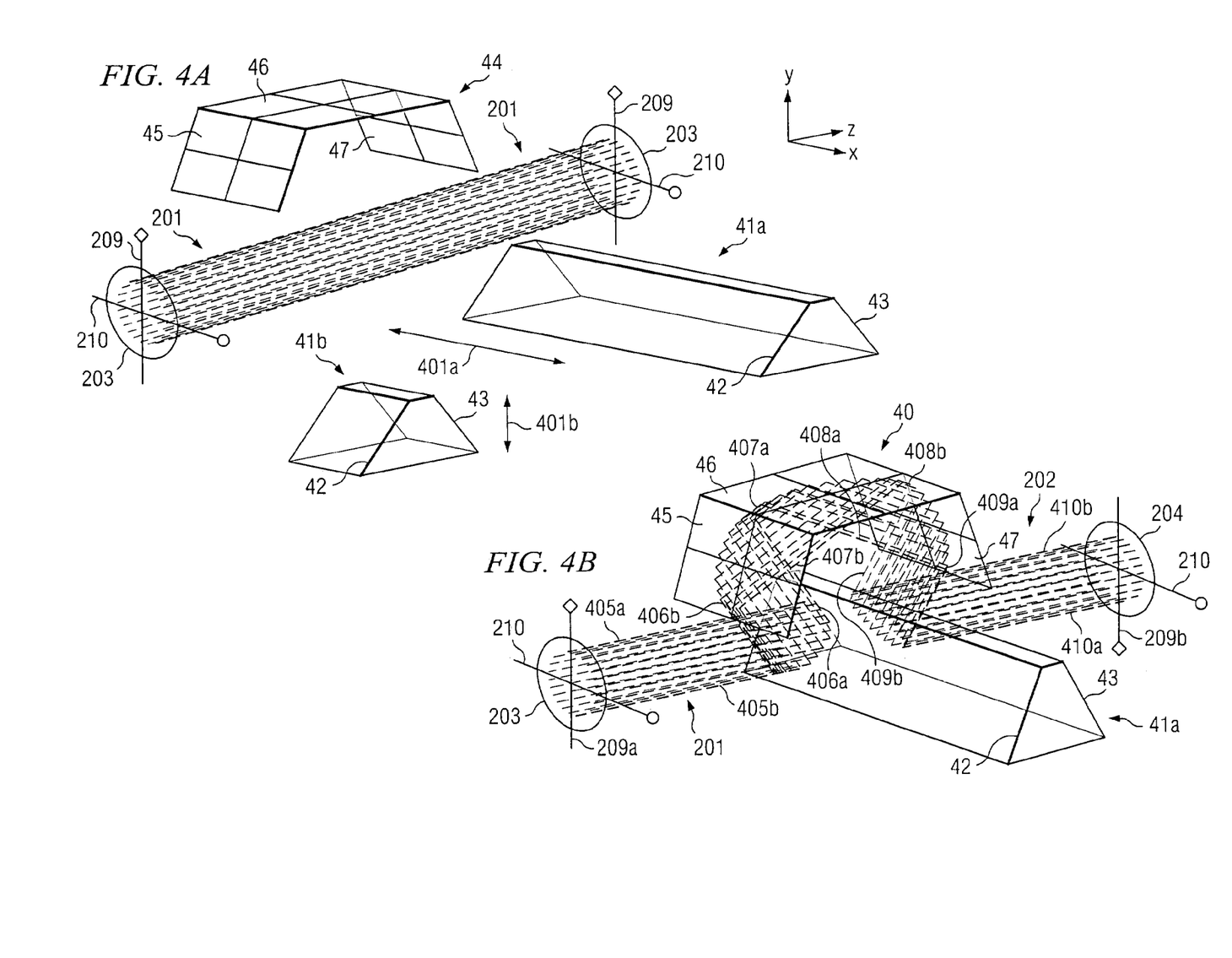
FIGS. 4A and 4B illustrate further embodiments for accomplishing reversible inversion of a beam wavefront, involving substantially linear insertion into and retraction from the input beam of a pick-off prism.

FIGS. 4A and 4B illustrate further embodiments for accomplishing reversible inversion of beam wavefront 203 having respective vertical and horizontal axes 209a and 210, involving insertion into and retraction from input beam 201, for example along horizontal direction 401a, of pick-off prism 41a having reflectively coated wedge surfaces 42 and 43, which deflect input beam 201 onto a substantially stationary reflective component 44 and then realign the reflected and wavefront-inverted beam 202 along its original z-axis direction. Referring to FIG. 4A, when pick-off prism 41a is retracted, there is no effect on input beam 201. Alternatively to pick-off prism 41a, pick-off prism 41b can be inserted into and retracted from input beam 201 along vertical direction 401b. Referring to FIG. 4B, when pick-off prism 41a (or equivalently 41b) is inserted into input beam 201 in the illustrated orientation, the input beam is processed by the assembly incorporating pick-off prism 41a and stationary reflective component 44, such that input wavefront 203 is inverted relative to the vertical y-axis to produce output wavefront 204 having inverted vertical wavefront axis 209b. Output wavefront 204 is unaltered relative to input wavefront 203 relative to horizontal wavefront axis 210. Input beam 201 is first deflected by reflective wedge surface 42 to reflective stationary surface 45, where it is again reflected onto reflective stationary surface 46. The reflected beam from reflective stationary surface 46 is then reflected from reflective stationary surface 47 onto reflective wedge surface 43, from which it is deflected to form output beam 202 propagating in the original z-axis direction. Once again, in a manner similar to that described in connection with FIG. 2A, top and bottom individual rays 405a–410a and 405b–410b of input beam 201 can be traced through the assembly of pick-off prism 41a and stationary reflective component 44 to obtain the described wavefront inversion in output beam 202, such that the top output ray is ray 410b and bottom output ray is ray 410a.

In accordance with the above-described embodiments, a Dove prism or equivalent mirror assembly can be implemented to invert the wavefront in a collimated beam after the light has been filtered by the internal slit of a four-pass monochromator, for example a Littman-Metcalf monochromator (M. Littman and H. Metcalf, "Spectrally Narrow Pulsed Dye Laser without Beam Expander," Appl. Opt. 17, 1978, pp. 2224–2227). The prism or equivalent mirror assembly is positioned such as to invert the wavefront for the third and fourth passes from the diffraction grating (not shown) relative to the first and second passes, thereby creating an additive architecture. If the prism were reoriented orthogonally about an axis coaxial with the beam, the architecture would revert to subtractive, with wavefront inversion produced by the slit alone in both horizontal and vertical axes.

Figure 5A:
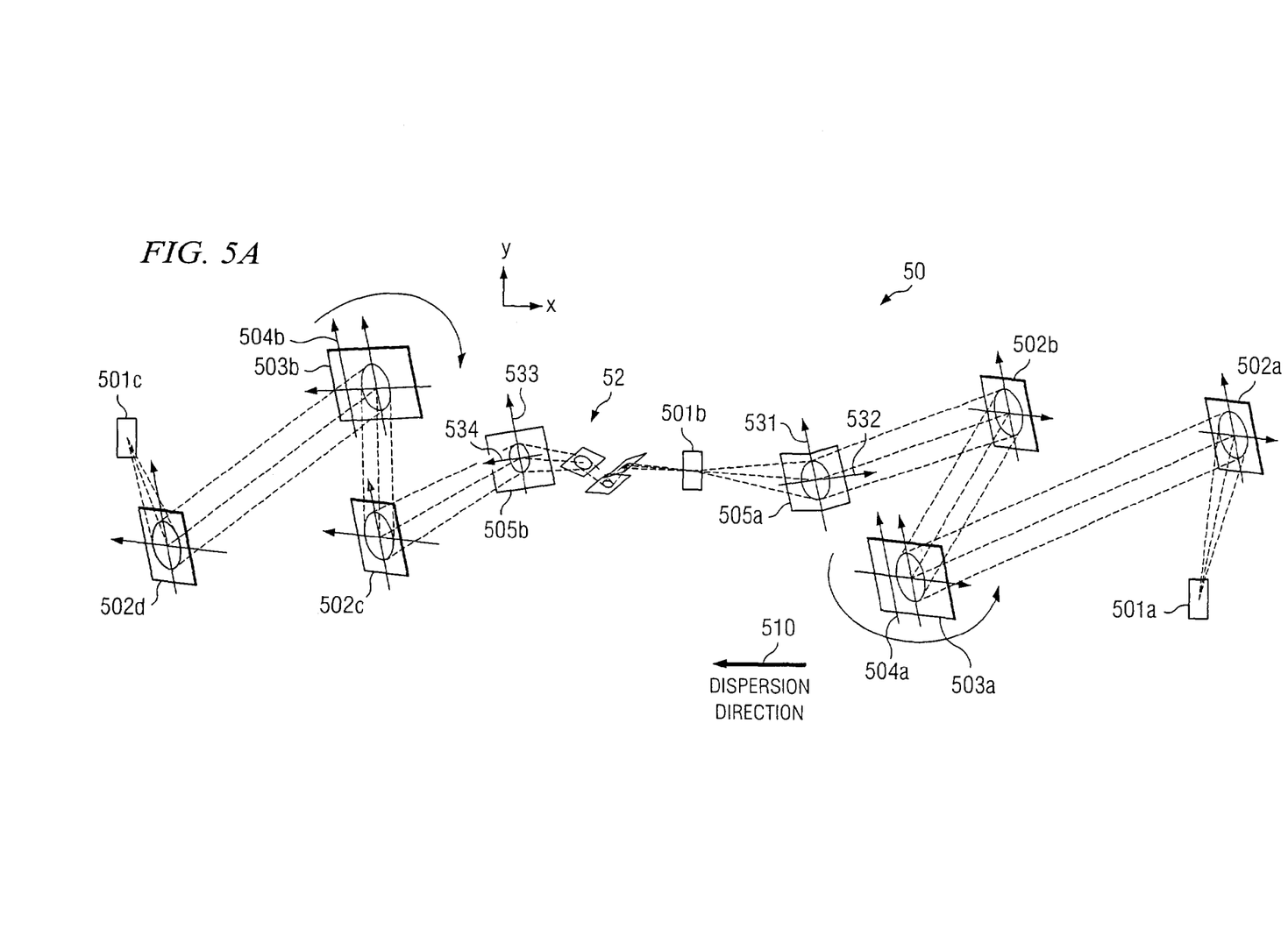
FIGS. 5A–5C are schematic diagrams depicting a further reflective Dove assembly implementation between two Czerny-Turner monochromator systems in a serial dual monochromator.
Figure 5B:
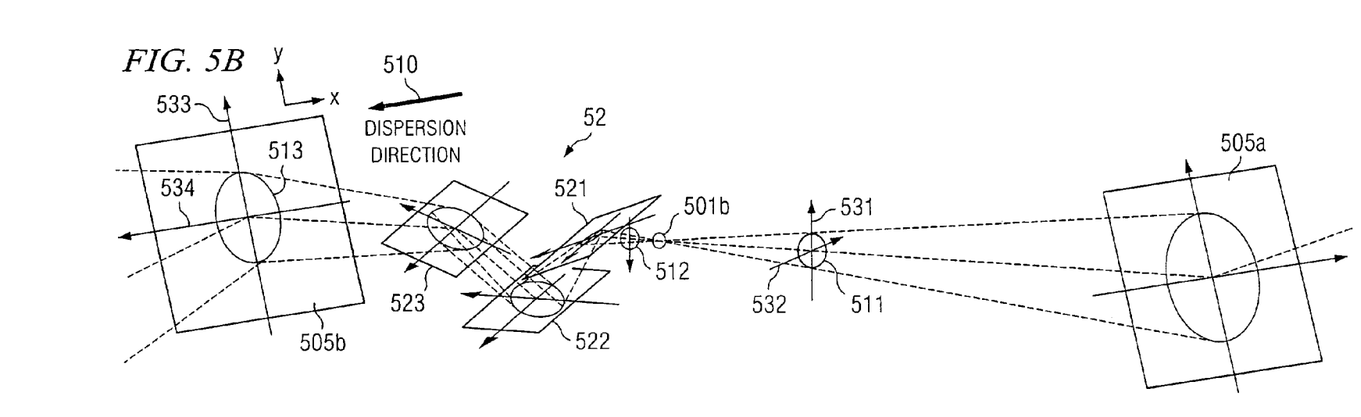
Figure 5C:
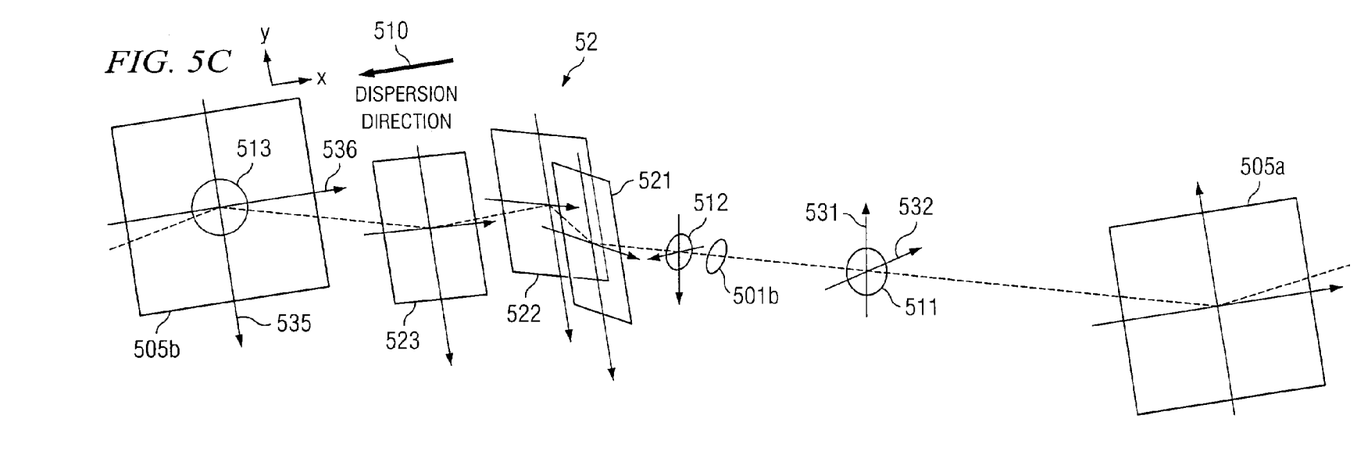

FIGS. 5A–5C are schematic diagrams depicting a further reflective Dove assembly implementation between two Czerny-Turner monochromator systems 51a, 51b (see M. Czerny and F. Turner, "Über den Astigmatismus bei Spiegelspectrometern," Z. Physik 61, 1930, pp. 792–797) in serial dual monochromator 50. An input light beam is focused into first monochromator 51*a* through entrance slit 501*a*, collimated by first parabolic mirror 502*a*, spectrally dispersed by first diffraction grating 503*a* having grating lines 504*a* oriented parallel to the y-axis, and refocused by second parabolic mirror 502*b* onto internal slit spectral filter 501*b* between first monochromator 51*a* and second monochromator 51*b* of dual monochromator 50. Dove reflective inversion assembly 52 is positioned in the diverging beam just after output focus 50*b* of first monochromator 51*a*. In second monochromator 51*b*, the dispersed and filtered beam diverging from internal focus slit 501*b* is recollimated at third parabolic mirror 502*c*, further dispersed at second diffraction grating 503*b* having grating lines 504*b* parallel to grating lines 504*a*, and refocused by fourth parabolic mirror 502*d* onto exit slit 501*c*. Optional fold mirrors 505*a*, 505*b* are disposed to facilitate a compact overall configuration of dual monochromator 50. A non-collimated architecture such as that depicted at the diverging beam location of Dove inversion assembly 52 in FIG. 5A requires the use of an all-reflective Dove embodiment.

In dual monochromator 50, since grating lines 504*a* and 504*b* of both diffraction gratings 503*a* and 503*b* are oriented parallel to the y-axis, dispersion direction 510 is consequently parallel to the x-axis in accordance with diffraction grating theory and practice well known in the art. FIG. 5B is a schematic diagram illustrating in more detail a portion of FIG. 5A including Dove inversion assembly 52. From fold mirror 505*a* the beam converges onto internal focus slit 501*b*. Wavefront 511 with vertical wavefront axis 531 and horizontal wavefront axis 532 in the converging beam from fold mirror 505*a* is inverted in both transverse axes as indicated by the arrow directions at wavefront 512 in the diverging beam after passing through internal focus slit 501*b* and prior to impinging on Dove inversion assembly 52, incorporating reflective surfaces 521–523. Dove inversion assembly 52 is oriented to invert wavefront 512 in the y-axis direction only, which is orthogonal to dispersion direction 510. At fold mirror 505*b* this results in wavefront 513 having inverted y-axis 533 and non-inverted x-axis 534 relative to wavefront 512. The aggregate wavefront inversion between first diffraction grating 503*a* and second diffraction grating 503*b* is produced by passing the beam through combined internal focus slit 501*b* and Dove inversion assembly 52. Internal focus slit 501*b* produces wavefront inversion in both dispersion and non-dispersion axes, whereas Dove inversion assembly 52 produces wavefront inversion in the non-dispersion direction only. Since there is only a single wavefront inversion in the dispersion direction, the architecture of dual monochromator 50 is subtractive.

FIG. 5C is a detailed schematic diagram illustrating the same components as in FIG. 5B, except that all reflective surfaces 521–523 of Dove inversion assembly 52 are reoriented orthogonally about the beam propagation axis. In this case, Dove inversion assembly 52 is oriented to invert wavefront 512 in the x-axis direction only, which is parallel to dispersion direction 510. At fold mirror 505*b* this results in wavefront 513 having inverted x-axis 536 and non-inverted y-axis 535 relative to wavefront 512. The aggregate wavefront inversion between first diffraction grating 503*a* and second diffraction grating 503*b* is then that internal focus slit 501*b* produces wavefront inversion in both dispersion and non-dispersion axes, whereas Dove inversion assembly 52 produces wavefront inversion in the dispersion direction only. Since there are now two successive wavefront inversions in the dispersion direction, the architecture of dual monochromator 50 is additive. In accordance with the teachings of the embodiments, the architecture of dual monochromator 50 is reversibly convertible between subtractive and additive by reorienting Dove assembly 52 orthogonally about the propagation axis of the beam.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for inverting with respect to the dispersion direction the wavefront of an optical beam in a monochromator employing more than one pass of said optical beam through the dispersing medium, said system comprising:
   at least one optical component including at least one reflective surface, said at least one optical component operable when positioned in said optical beam between successive passes of said optical beam through said dispersing medium to deflect said optical beam from a first optical path and to redirect said deflected optical beam along a second optical path coaxial with said first optical path, such that said wavefront in said second optical path is inverted with respect to said dispersion direction from said wavefront in said first optical path;
   wherein said inverting is operable to be reversible, depending upon the position of said at least one optical component, and wherein said inverting is operable to be reversible by reorienting said at least one optical component orthogonally about an axis coaxial with said first optical path.

2. The system of claim 1 wherein said inverting is operable to be successively reversible by reorienting said at least one optical component in successive orthogonal increments in a monotonic direction.

3. A system for inverting with respect to the dispersion direction the wavefront of an optical beam in a monochromator employing more than one pass of said optical beam through the dispersing medium, said system comprising:
   at least one optical component including at least one reflective surface, said at least one optical component operable when positioned in said optical beam between successive passes of said optical beam through said dispersing medium to deflect said optical beam from a first optical path and to redirect said deflected optical beam along a second optical path coaxial with said first optical path, such that said wavefront in said second optical oath is inverted with respect to said dispersion direction from said wavefront in said first optical path;
   wherein said inverting is operable to be reversible, depending upon the position of said at least one optical component, and wherein said inverting is operable to be reversible by displacing a component of said at least one optical component alternately into and out of said first optical path.

4. A system for inverting with respect to the dispersion direction the wavefront of an optical beam in a monochromator employing more than one pass of said optical beam through the dispersing medium, said system comprising:

at least one optical component including at least one reflective surface, said at least one optical component operable when positioned in said optical beam between successive passes of said optical beam through said dispersing medium to deflect said optical beam from a first optical path and to redirect said deflected optical beam along a second optical path coaxial with said first optical path, such that said wavefront in said second optical path is inverted with respect to said dispersion direction from said wavefront in said first optical path;

wherein said inverting is operable to be reversible, depending upon the position of said at least one optical component, and wherein said at least one optical component comprises a Dove prism.

5. The system of claim 1 wherein said at least one optical component comprises a plurality of optically all-reflective surfaces.

6. The system of claim 5 wherein said optically all-reflective surfaces are distributed between at least one translatable component and one stationary component.

7. The system of claim 1 wherein said monochromator comprises a serial dual monochromator.

8. The system of claim 1 wherein said monochromator employs two passes of said optical beam through said dispersing medium.

9. The system of claim 1 wherein said inverting is operable to convert the operation of said monochromator between an additive mode and a subtractive mode.

10. A method for changing between an additive mode and a subtractive mode the operation of a monochromator employing an optical beam making more than one pass through a dispersing medium, said method comprising:

positioning at least one optical component in said optical beam between successive passes of said optical beam through said dispersing medium;

transmitting said optical beam through said at least one optical component; and inverting the wavefront of said transmitted optical beam with respect to the dispersion direction of said dispersing medium;

wherein said inverting is reversible depending on said positioning, and wherein said at least one optical component comprises a Dove prism.

11. The method of claim 10 wherein said inverting comprises deflecting said optical beam from a first segment of an optical path and redirecting said deflected optical beam onto a second segment of said optical path coaxial with said first segment, such that said wavefront in said second segment is inverted from said wavefront in said first segment.

12. The method of claim 11 wherein said inverting is reversed by reorienting said at least one optical component orthogonally about an axis coaxial with said first segment of said optical path.

13. The method of claim 11 wherein said inverting is reversed by displacing a component of said at least one optical component alternately into and out of said first segment of said optical path.

14. The method of claim 10 wherein said at least one optical component comprises a plurality of optically all-reflective surfaces.

15. The method of claim 14 wherein said optically all-reflective surfaces are distributed between at least one translatable component and one stationary component.

16. The method of claim 10 wherein said monochromator comprises a serial dual monochromator.

17. The method of claim 10 wherein said monochromator employs two passes of said optical beam through said dispersive medium.

* * * * *

UNITED STATES PATENT AND TRADEMARK OFFICE
CERTIFICATE OF CORRECTION

PATENT NO. : 6,989,898 B2  Page 1 of 1
APPLICATION NO. : 10/361304
DATED : January 24, 2006
INVENTOR(S) : Hopler et al.

It is certified that error appears in the above-identified patent and that said Letters Patent is hereby corrected as shown below:

On the Title Page, Item 56, under "Other Publications", line 4, delete ""Spectraqlly" and insert -- "Spectrally --, therefor.

In column 8, line 60, in Claim 3, delete "optical oath" and insert -- optical path --, therefor.

Signed and Sealed this

Twenty-second Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 6,989,898 B2 Page 1 of 1
APPLICATION NO. : 10/361304
DATED : January 24, 2006
INVENTOR(S) : Hopler et al.

It is certified that error appears in the above-identified patent and that said Letters Patent is hereby corrected as shown below:

On the title page, Item -56- under "Other Publications", line 4, delete ""Spectraqlly" and insert -- "Spectrally --, therefor.

In column 8, line 60, in Claim 3, delete "optical oath" and insert -- optical path --, therefor.

Signed and Sealed this

Twenty-ninth Day of January, 2008

JON W. DUDAS
*Director of the United States Patent and Trademark Office*